United States Patent [19]

Takahashi et al.

[11] Patent Number: 5,187,012
[45] Date of Patent: Feb. 16, 1993

[54] THERMOPLASTIC MATERIALS AND ARTICLE MADE THEREFROM

[75] Inventors: Nobukazu Takahashi, Yokohama; Teiji Kohara, Kawasaki; Tadao Natsuume, Yokosuka, all of Japan

[73] Assignee: Nippon Zeon Co., Ltd., Tokyo, Japan

[21] Appl. No.: 630,640

[22] Filed: Dec. 20, 1990

[30] Foreign Application Priority Data

Dec. 26, 1989 [JP] Japan .................. 1-335192

[51] Int. Cl.$^5$ .................. B32B 33/00; C08K 5/05
[52] U.S. Cl. .................. 428/402; 428/521;
428/523; 524/147; 524/323; 524/347; 524/576;
524/579; 526/281; 526/282; 526/283;
346/135.1; 346/137
[58] Field of Search .................. 526/281, 282, 283;
525/338; 524/579, 147, 323, 347, 576; 428/523,
402, 521; 346/135.1, 137

[56] References Cited

FOREIGN PATENT DOCUMENTS 0203799 12/1986 European Pat. Off. ............ 526/281

*Primary Examiner*—Fred Teskin
*Attorney, Agent, or Firm*—Armstrong, Westerman, Hattori, McLeland & Naughton

[57] ABSTRACT

The present invention provides a thermoplastic composition excellent in heat resistance and water resistance which includes a thermoplastic saturated norbornene polymer which has a number-average molecular weight (Mn) of 50,000–500,000 and a weight-average molecular weight (Mw) of 100,000–2,000,000 which are measured by high performance liquid chromatography, and a molecular weight distribution (Mw/Mn) of 2.2 or more, and a volatile content of at most 0.3% by weight higher. The composition is suitable for optical materials, electroconductive composite materials and optical recording media.

18 Claims, No Drawings

THERMOPLASTIC MATERIALS AND ARTICLE MADE THEREFROM

BACKGROUND OF THE INVENTION

1. Field of the Invention

The present invention relates to a thermoplastic material excellent in heat resistance and water resistance which comprises thermoplastic saturated norbornene polymer and more particularly, to a thermoplastic material which can provide articles excellent in strength and free from defects caused by blowing especially when it is extrusion formed.

The present invention further relates to a film-like or sheet-like article made from the above thermoplastic material and excellent in strength and free from fine defects.

Moreover, the present invention relates to an optical material made from the above thermoplastic material and excellent in transparency and an electroconductive composite material and an optical recording medium made from the above material.

2. Related Art

In general, polyolefinic polymers have such structure as consisting of only carbon and hydrogen and having no unsaturated bond and therefore, have the features that they are low in affinity with water and do not absorb or permeate water and besides, are high in resistance to acid, alkali and other chemicals or various solvents.

Representatives thereof are polyethylene and polypropylene and these are employed for various uses in the form of sheet, film, pipe, rod, and the like formed by melt extrusion. However, these conventional materials suffer from the problems that they are insufficient in heat resistance and become distorted at relatively low temperatures of 70°-80° C. or lower and cannot be used at a temperature higher than such temperature. Furthermore, these materials are low in transparency and cannot be used for optical purposes.

On the other hand, polycarbonate (PC) and polymethyl methacrylate (PMMA) have been mainly used as optical transparent plastic materials for optical disc substrate, plastic lens and the like. However, PC is high in birefringence and PMMA is high in water absorption and insufficient in heat resistance. Thus, these materials are not enough to meet the increasingly heightened demands.

Recently, attention has been given to thermoplastic saturated norbornene polymers such as hydrogenated products of ring opening polymers of norbornene monomers and addition polymers of norbornene monomers and ethylene as optical plastic materials such as optical disc substrate. (Japanese Patent Kokai Nos. Sho 60-26024 and 63-31752 and Hei 1-24826, EP 303246 and EP 317262, and U.S. Pat. No. 4614778).

These thermoplastic saturated norbornene polymers are a kind of polyolefin polymers and have excellent water resistance, chemical resistance and solvent resistance like other polyolefin polymers and besides, polymers having a high heat resistance of higher than the glass transition temperature 100° C can be synthesized. Furthermore, they have a total light transmittance of 90% or higher and thus, are superior in transparency.

Therefore, thermoplastic saturated norbornene polymers not only have the possibility of being used for various uses as polyolefin materials having heat resistance, but also have the possibility of being developed for optical uses as transparent materials having both the low birefringence and excellent transparency, water resistance and heat resistance.

However, these thermoplastic saturated norbornene polymers are brittle as compared with polyethylene, polypropylene and PMMA and, when extrusion formed into sheet, film, and rod, are apt to crack or break and articles of sufficient strength have not been obtained. There are further problems that a bubble-like defect is often generated in extrusion formed articles, which appears on the surface in the form of visible streaks or which reduces strength. Even if visible large streaks are not present, in many cases, observation in detail under light microscope reveals invisible fine voids or crack-like defects (hereinafter referred to as "microvoid") generated inside of the molded articles. Thus, hitherto, extrusion formed articles of thermoplastic saturated norbornene polymers with no microvoids have not been obtained.

As other method for obtaining sheet-like or film-like articles, there is a casting method which comprises casting a polymer as a solution in a suitable solvent and evaporating the solvent and according to this method there are obtained articles having substantially no microvoids. However, even if it is a thin article of a few $\mu$m in thickness, solvent cannot be completely evaporated and a few % of solvent remains and sufficient strength cannot be obtained. Furthermore, the remaining solvent gradually evaporates during using the article to change properties of the article or the evaporated solvent adversely influences other parts provided around the article. From the point of endurance, film-like or sheet-like articles are required to have a tensile strength of at least 800 kg/cm$^2$, preferably at least 900 kg/cm$^2$, but those which have such sufficient strength have not been obtained by casting method.

Therefore, hitherto, there have not yet been provided sheet-like or film-like articles comprising a thermoplastic saturated norbornene polymer which have no defects such as microvoids and cracks and have sufficient strength of at least 800 kg/cm$^2$ in tensile strength.

SUMMARY OF THE INVENTION

The object of the present invention is to provide a thermoplastic material excellent in heat resistance and water resistance.

One aspect of the present invention is directed to a material comprising thermoplastic saturated norbornene polymers which provides articles superior in strength and free from defects due to blowing or streaking and microvoids especially when it is extrusion formed and an article comprising the above material.

Another aspect of the present invention is directed to an optical material excellent in transparency which comprises the above material, and an electroconductive composite material and an optical recording medium made from the above material.

As a result of intensive research conducted by the inventors in an attempt to solve the above-mentioned problems, it has been found that thermoplastic saturated norbornene polymers having a proper range of molecular weight and a proper range of molecular weight distribution have sufficient strength when molded or formed.

Conventional thermoplastic saturated norbornene polymers contain unreacted monomers and low voltatile components such as solvent and it has been found that these cause reduction of strength or formation of streaks on the surface due to blowing. Accordingly, when content of the low volatile component in the polymers is reduced to 0.3% by weight or less, blowing and formation of large visible streaks can be inhibited even when the polymers are extrusion formed. Moreover, it has been recognized that some antioxidants added to thermoplastic saturated norbornene polymers promote the reduction of strength and formation of surface streaks caused by blowing, but it has been found that when a specific low volatile antioxidant is selected and used, the problems such as decomposition, deterioration and coloration of polymers can be solved without damaging the characteristics of the polymers.

Furthermore, even if extrusion formed articles of thermoplastic saturated norbornene polymers appear to have no defects by visual examination, there are often present microvoids or crack-like defects in inner part of the article when observed in detail by light microscope and the like. As a result of intensive research in order to solve these problems, it has been found that when pellets obtained by melt extrusion are dried under high temperature conditions, for example, high temperature of somewhat lower than glass transition temperature (Tg) before subjected to extrusion molding and then are used, molded or formed products free from microvoids can be obtained. This drying treatment is effective also when the material is injection molded and the thus obtained molded articles are also excellent in endurance under high temperature and high humidity and microvoids are not formed for a long period of time.

As explained above, the inventors have found that thermoplastic material which can provide transparent articles having no defects in inner part and on the surface can be obtained by controlling molecular weight and molecular weight distribution of thermoplastic saturated norbornene polymers to specific ranges and reducing content of volatile component to less than a specific amount and by selecting and using a low volatile antioxidant.

This thermoplastic material shows no irregular reflection of light, is excellent in optical characteristics and provides articles excellent also in strength, water resistance and heat resistance, and so is especially suitable as optical material. Furthermore, since the molding material is high in heat resistance and does not permeate water, electroconductive composite material of high endurance can be obtained by forming an electroconductive layer on an article made from the material. Further, it has been found that an optical recording medium excellent in various characteristics can be obtained by providing a recording thin film which can perform optical recording and/or reading on a transparent substrate made from the above material.

The present invention has been accomplished based on these findings.

Thus, the present invention provides a molding or forming material comprising a thermoplastic saturated norbornene polymer, characterized in that it has a number-average molecular weight (Mn) of 50,000-500,000 and a weight-average molecular weight (Mw) of 100,000- 2,000,000 measured by hi9h performance liquid chromatography and a molecular weight distribution (Mw/Mn) of 2.2 or more, and amount of volatile component contained in the polymer is 0.3% by weight or less.

Furthermore, the present invention provides a molding or forming material which comprises 100 parts by weight of the above-mentioned thermoplastic saturated norbornene polymer and 0.01-5 parts by weight of an antioxidant having a vapor pressure of $10^{-6}$ Pa or less at 20° C.

Moreover, the present invention provides the above-mentioned material which has been pelletized by melt extrusion and then dried at high temperature.

In addition, the present invention provides a film-like or sheet-like article formed of the above material, an optical material, an electroconductive composite on which an electroconductive film is formed, and a optical recording medium comprising a transparent substrate comprising the above film-like or sheet-like article on which is provided a recording thin film capable of performing optical recording and/or reading.

DETAILED DESCRIPTION OF THE INVENTION (Thermoplastic saturated norbornene polymer)

The molding or forming material aimed at by the present invention is a thermoplastic saturated norbornene polymer and examples thereof are polymers having structural units represented by the following formulas [I] and/or [II].

Formula [I]:

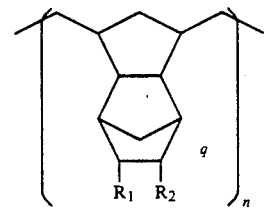

[wherein $R_1$ and $R_2$ each represents a hydrogen atom, a hydrocarbon residue or a polar group such as halogen, ester, nitrile, pyridyl, or the like and may be identical or different and besides, $R_1$ and $R_2$ may form a ring together, n represents a positive integer and q represents 0 or a positive integer].

Formula [II]:

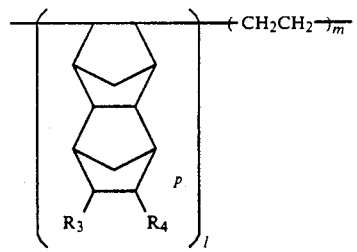

[wherein $R_3$ and $R_4$ each represents a hydrogen atom, a hydrocarbon residue or a polar group such as halogen, ester, nitrile, pyridyl or the like and may be identical or different and $R_3$ and $R_4$ may form a ring together, ( and m each represents a positive integer and p represents 0 or a positive integer].

The polymer having the structural unit represented by the formula [I]is a saturated polymer prepared by hydrogenation, by usual hydrogenation process, of a ring opening polymer obtained by polymerization of one or more of the following monomers by known ring opening polymerization: norbornene; its alkyl and/or alkylidene substituted compounds such as 5-methyl-2-norbornene, 5,6-dimethyl-2-norbornene, 5-ethyl-2-norbornene, 5-butyl-2-norbornene, and 5-ethylidene-2-norbornene; dicyclopentadiene and 2,3-dihydrodicyclopentadiene and these compounds substituted with alkyl such as methyl, ethyl, propyl or butyl or polar group such as halogen; dimethanooctahydronaphthalene and this compound substituted with alkyl, alkylidene or polar group such as halogen such as 6-methyl-1,4:5,8-dimethano-1,4,4a,5,6,7,8,8a-octahydronaphthalene, 6-ethyl-1,4:5,8-dimethano-1,4,4a,5,6,7,8,8a-octahydronaphthalene, 6-ethylidene-1,4:5,8-dimethano-1,4,4a,5,6,7,8,8a-octahydronaphthalene, 6-chloro-1,4:5,8-dimethano-1,4,4a,5,6,7,8,8a-octahydronaphthalene, 6-cyano-1,4:5,8-dimethano-1,4,4a,5,6,7,8,8a-octahydronaphthalene, 6-pyridyl-1,4:5,8-dimethano-1,4,4a,5,6,7,8,8a-octahydronaphthalene, and 6-methoxycarbonyl-1,4:5,8-dimethano- 1,4,4a,5,6,7,8,8a-octahydronaphthalene; and trimers-tetramers of cyclopentadiene such as 4,9:5,8-dimethano-3a,4,4a,5,8,8a,9,9a-octahydro-1H-benzoindene and 4,11:5,10:6,9-trimethano-3a,4,4a,5,5a,6,9,9a,10,10a,11,11a-dodecahydro-1H-cyclopentaanthracene.

In order to obtain the objective hydrogenated ring opening polymers (saturated polymer) having a glass transition temperature (Tg) of 100° C or higher, it is preferred to use tetracyclic or pentacyclic monomers among these norbornene monomers or to use these tetracyclic or pentacyclic monomers as main component in combination with dicyclic or tricyclic monomers. From the point of birefringence, it is especially preferred to use tetracyclic lower alkyl substituted monomer or alkylidene substituted monomer as main component. The lower alkyl or alkylidene group is preferably of 2-3 carbon atoms.

The polymer having the structural unit represented by the formula [II] is a polymer obtained by addition copolymerization of at least one of the above-mentioned norbornene monomers and ethylene as monomers by known process and/or a hydrogenated product of the resulting polymer and these are all saturated polymers.

Furthermore, the thermoplastic saturated norbornene polymers may be polymers obtained by preparing polymer [I] or [II] in the presence of α-olefins such as 1-butene, 1-pentene and 1-hexene as molecular weight modifier or by copolymerization of the above monomers with other monomer components, e.g., cycloolefins such as cyclopropene, cyclobutene, cyclopentene, cycloheptene, cyclooctene, and 5,6-dihydrocyclopentadiene added as a minor component.

The thermoplastic saturated norbornene polymers in the present invention must have a number-average molecular weight (Mn) of 50,000–500,000, preferably 60,000–200,000 and a weight-average molecular weight (Mw) of 100,000–2,000,000, preferably 100,000–1,000,000 which are measured by high performance liquid chromatography (HLC) analysis using toluene as solvent and a molecular weight distribution (Mw/Mn) of 2.2 or more.

If Mn and Mw are less than the above ranges, extrusion formed articles such as film, sheet and rod do not have sufficient strength. To the contrary, if Mn and Mw are larger than the above ranges, moldability is inferior and extrusion forming is difficult because of too high viscosity. Besides, when the polymer is dissolved in a suitable solvent for casting or spinning, solubility in solvent is insufficient. Besides, synthesis reaction for polymer of such high molecular weight is difficult to control and there is the disadvantage that material of stable quality cannot be obtained.

Moreover, molecular weight distribution (Mw/Mn) must be 2.2 or more and preferred is 2.4 or more and especially preferred is 2.8 or more.

It is generally considered that thermoplastic polymers smaller in molecular weight distribution and close to monodispersion ar superior in balancing between strength and moldability and superior in performance. However, when such polymer as of the present invention which has relatively high molecular weight is extrusion formed, for example, into a sheet or a film, stress is not retained and flat and beautiful articles as a whole can be obtained in the case where molecules of various molecular weights gradually solidify in the order of from the molecule higher in molecular weight to the molecule lower in molecular weight as compared with the case where monodispersed molecules instantaneously and simultaneously solidify at a certain temperature in the course of solidification of polymer from molten state with cooling. This tendency is especially conspicuous for thermoplastic saturated norbornene polymer because the polymer is rigid and high in heat resistance and molding or forming temperature reaches considerably high temperature near 300° C. Therefore, for attaining the object of the present invention, molecular weight distribution must be 2.2 or more and is preferably 2.4 or more and especially preferably 2.8 or more. If the molecular weight distribution is lower than the above range, there are the defects that extrusion forming is difficult and formed articles superior in smoothness and optical characteristics are obtained with difficulty.

With increase in molecular weight distribution (Mw/Mn), moldability is improved. In general, in polymers such as polycarbonate which are high in heat resistance and rigidity, the phenomenon is apt to occur that when they are rapidly cooled from molten state, strain is generated inside the polymers and flat articles cannot be obtained. The same phenomenon may also occur in thermoplastic norbornene polymers. For example, when the polymer is extruded from T-die of extruder and taken off in the form of a sheet, a flat sheet cannot be drawn unless roll temperature is raised. In the case of polymer having a Tg of about 140° C., it can be drawn in the form of flat sheet by raising roll temperature to 120°-140° C. However, in many cases, heating of roll is carried out with water and so the roll temperature can only be raised to at most about 90° C.

If molecular weight distribution is less than 2.2, molding or forming cannot be satisfactorily performed even when roll temperature is raised to about 140° C which is close to the glass transition temperature of the polymer while when the molecular weight distribution is 2.2 or more, a flat article can be obtained by raising roll temperature to about 110°-130° C. Furthermore, when the molecular wight distribution is extended to 2.8 or more, moldability is further improved and a flat article free from internal strain can be obtained even at a roll temperature of about 90°-100° C.

There is no special upper limit in molecular weight distribution, but if it is too large, Mn is large and sufficient strength cannot be obtained in spite of the high melt viscosity and besides, synthesis of such polymer per se becomes difficult. Therefore, in general, it is preferably about 6.0 or less.

Thermoplastic saturated norbornene polymers having such molecular weights (Mn, Mw) and molecular weight distribution (Mw/Mn) can be produced, for example, in the following manner: In synthesis reaction, amount of catalyst used is changed or polymerization temperature is changed; in the case of using a molecular weight modifier, kind or amount thereof is changed; monomers are added later to the reaction system by prop; or polymer of low molecular weight and that of high molecular weight are separately prepared and these are blended to extend the molecular weight distribution.

When unsaturated bond remaining in molecular chain of the synthesized polymer is saturated by hydrogenation reaction, hydrogenation rate is 90% or more, preferably 95% or more, especially preferably 99% or more from the points of photo-deterioration resistance and weathering resistance.

From the points of heat resistance and moldability, the polymer in the present invention preferably has a Tg of 100° C. or higher, preferably 120°–200° C., more preferably 130°–180° C.

(Method for reducing volatile content)

Thermoplastic saturated norbornene polymers obtained by usual synthesis method generally contain 0.5% by weight or more of volatile component.

In the molding or forming material of the present invention, content of volatile component in thermoplastic saturated norbornene polymer is 0.3% by weight or less, preferably 0.2% by weight or less and more preferably 0.1% by weight or less.

In the present invention, loss in weight on heating of from 30° C. to 350° C. is obtained by a differential thermal weight measuring apparatus (TG/DTA200) manufactured by Seiko Electronics Industries, Ltd. and this is taken as content of volatile component.

If the content of volatile component is more than the above range, when the polymer is extrusion formed at a temperature of about 250°–350° C., the volatile component is volatilized during forming to cause blowing, resulting in defects in the article or reduction of strength or streaks on the surface of the article.

For reducing content of volatile component, for example, there is polymer coagulation method using a bad solvent where coagulation is repeatedly by carried out. In the case of direct drying method, it is desired to carry out drying at higher than 250° C. and under less than 30 Torr using a thin film dryer or extrusion dryer. It is also possible to carry out direct drying after solvent solution of polymer is concentrated to several ten %. Of course there is no limitation in method for reduction of volatile content.

Thermoplastic saturated norbornene polymers produced by these methods are substantially amorphous, are excellent in transparency, dimensional stability, heat resistance and water absorption, and has substantially no moisture permeability.

(Antioxidant)

In the present invention, when 0.01–5 parts by weight of a low volatile antioxidant is added to 100 parts by weight of the thermoplastic saturated norbornene polymer, decomposition or coloration of the polymer during molding or forming can be effectively inhibited.

The antioxidant preferably has a vapor pressure of $10^{-6}$ Pa or less at 20° C., especially preferably $10^{-8}$ Pa or less. If vapor pressure is higher than $10^{-6}$ Pa, there are problems that blowing occurs at extrusion forming and the antioxidant volatilizes from the surface of article when exposed to high temperature.

Antioxidants usable in the present invention include, for example, the following. These can be used singly or in combination of two or more.

Hindered phenol type:

2,6-di-t-butyl-4-methylphenol, 2,6-di-t-butylphenol, 4-hydroxymethyl-2,6-di-t-butylphenol, 2,6-di-t-butyl-α-methoxy-p-dimethyl-phenol, 2,4-di-t-amylphenol, t-butyl-m-cresol, 4-t-butylphenol, styrenated phenol, 3-t-butyl-4-hydroxyanisole, 2,4-dimethyl-6-t-butylphenol, octadecyl-3-(3,5-di-t-butyl-4-hydroxyphenol)-propionate, 3,5-di-t-butyl-4-hydroxybenzylphosphonatediethyl ester, 4,4'-bisphenol, 4,4'-bis-(2,6-di-t-butylphenol), 2,2'-methylene-bis-(4-methyl-6-t-butylphenol), 2,2'-methylene-bis-(4-ethyl-6-butylphenol), 2,2'-methylene-bis-(4-methyl-6-α-methylcyclohexylphenol), 4,4'-methylene-bis-(2-methyl-6-t-butylphenol), 4,4'-methylene-bis-(2,6-di-t-butylphenol), 1,1'-methylene-bis-(2,6-di-t-butyl-naphthol), 4,4'-butylidene-bis-(2,6-di-t-butyl-metacresol), 2,2'-thio-bis-(4-methyl-6-t-butylphenol), di-o-cresol sulfide, 2,2'-thio-bis-(2-methyl-6-t-butylphenol), 4,4'-thio-bis-(3-methyl-6-t-butylphenol), 4,4'-thio-bis-(2,3-di-sec-amylphenol), 1,1'-thio-bis-(2-naphthol), 3,5-di-t-butyl-4-hydroxybenzyl ether, 1,6-hexanediol-bis-[3-(3,5-di-t-butyl-4-hydroxyphenyl)propionate], 2,4-bis-(n-octylthio)-6-(4-hydroxy-3,5-di-t-butylanilino)-1,3,5-triazine, 2,2-thio-diethylenebis[3-(3,5-di-t-butyl-4-hydroxyphenyl)propionate], 2,2-thio-bis(4-methyl-6-t-buytlphenol), N,N'-hexamethylenebis(3,5-di-ti-butyl-4-hydroxy-hydrocinnamide), bis(3,5-di-t-butyl-4-hydroxybenzylphosphonic acid ethyl ester)calcium, 1,3,5-trimethyl-2,4,6-tris-(3,5-di-t-butyl-4-hydroxybenzyl)-benzene, triethyleneglycol-bis[3-(3-t-butyl-5-methyl-4-hydroxyphenyl)propionate], 1,3,5-trimethyl-2,4,6-tris(3,5-di-t-butyl-4-hydroxybenzyl)benzene, tris-(3,5-di-t-butyl-4-hydroxybenzyl)-isocyanurate, and pentaerythrityltetrakis[3-(3,5-di-t-butyl-4-hydroxyphenyl)-propionate] etc., Aminophenol type:

n-butyl-p-aminophenol, n-butyroyl-p-aminophenol, n-pelargonoylp-aminophenol, n-lauroyl-p-aminophenol, n-stearoyl-p-aminophenol, 2,6-di-t-butyl-α-dimethyl, and amino-p-cresol, etc.

Hydroquinone type:

Hydroquinone, 2,5-di-t-butylhydroquinone, 2,5-di-t-amylhydroquinone, hydroquinone methyl ether, and hydroquinone monobenzyl ether, etc.

Phosphite type:

Triphosphite, tris(2,4-di-t-butylphenyl) phosphite, tris(nonylphenyl) phosphite, tetrakis(2,4-di-t-butylphenyl)-4,4'-biphenylene phosphonite, and 2-ethylhexyloctylphosphite, etc.

Others:

2-Mercaptobenzothiazole zinc salt, dicatecholborate-di-o-tolylguanidine salt, nickel-dimethyldithiocarbamate, nickel-pentamethylenedithiocarbamate, mercaptobenzimidazole, and 2-mercaptobenzimidazole zinc salt, etc.

(Other components)

The thermoplastic saturated norbornene polymers of the present invention may contain various antistatic agents, lubricants, surface active agents, ultraviolet absorbers, and the like as far as attainment of the object of the present invention is not damaged, as additives in addition to the antioxidants. Furthermore, when the polymer is used for uses other than optical materials, if necessary, additives such as fillers, e.g., glass fiber, dyes, and pigments may be added to the polymer.
(Pelletization and predrying)

Plastic material are normally supplied in the form of pellets of about 1–7 mm in diameter and about 4–8 mm in length and the pellets were molded or formed into desired shapes by extrusion forming or injection molding. In general, from the polymer synthesized, the solvent used in synthesis is removed by coagulation method or direct drying method and to the polymer were added the above various additives in the necessary amounts and then, in the case of thermoplastic saturated norbornene polymer, this is extruded into strands of a given diameter from the molten state at a temperature of about 230° C. or higher and thereafter, the strands are cut to a desired length to make pellets.

In the case of normal plastic materials, the pellets are molded or formed as they are, but in the case of highly hydroscopic or readily decomposable resins such as polycarbonate resin, acrylic resin, and polyamide resin, when they are molded or formed as they are, vigorous blowing occurs or defects such as large streaks on the surface of article occur due to water adsorbed to pellets during storage thereof and due to decomposition products, and so it is customary to carry out predrying at a temperature below glass transition temperature of the resin for several hours before use.

However, thermoplastic saturated norbornene polymers are low in hydroscopicity and do not contain components which decompose during storage and hitherto, the predrying has been considered to be needless and molding or forming has been performed without the predrying. Actually, even if predrying is attempted, substantially no volatile component is detected. However, surprisingly, it has been found that when pellets of thermoplastic saturated norbornene polymers are predried, articles free from microvoids are obtained while when predrying is not conducted, the microvoids, namely, invisible fine voids or cracks are generated in the articles.

The thus obtained article does not generate microvoids even after molded or formed and besides, does not generate microvoids even after being subjected to endurance test under high temperature and high humidity, for example, higher than 70° C. and higher than 80% in relative humidity. Furthermore, it has been confirmed that this drying treatment is effective also in the case of injection molding.

As conditions of the predrying, higher temperature and longer drying time are more effective, but if temperature is too high exceeding glass transition temperature of resin, pellets per se heat fusion-bond to each other and are difficult to use and the effect saturates in several hours. Therefore, the predrying is carried out for preferably 1 hour or longer, more preferably 2 hours or longer at preferably $(Tg-30) \sim (Tg-5)°$ C., more preferably $(Tg-20) \sim (Tg-5)°$ C.

Either vacuum drying or atmospheric drying in the air or nitrogen atmosphere is effective for the drying. The period from completion of drying treatment to use for molding or forming is preferably as short as possible, but it is not needed to be especially short and the effect is not lost even after lapse of several days.
(Molding or forming method)

The thermoplastic saturated norbornene polymer of the present invention is suitable especially for extrusion forming, but is not limited to this.

The polymer is heated to about 250°–300° C. and extruded from T-die or manifold die using a melt extruder and can be forming into sheet or film by winding-up by various rolls.

In this case, since thermoplastic saturated norbornene polymer is high in heat resistance and in rigidity, if it is rapidly cooled by roll, it cannot be faltly with generating surface waviness as in the case of polycarbonate and it is suitable to keep wind-up cooling rolls of the first and the second steps at a relatively high temperature of about 70°–140° C. according to the value of molecular weight distribution (Mw/Mn) as mentioned before and to carry out gradual cooling. It is also possible to further subject the sheet-like article to monoaxial or biaxial stretching.

In addition, it is also possible to carry out processing by calender rolling or to carry out coextrusion processing or laminate processing with other olefin resins such as polyethylene and polypropylene, polyester resins such as polyethylene tetraphthalate or halogenated hydrocarbon resins such as polyvinyl chloride and polyvinylidene chloride for further improvement of strength and gas permeability.

Moreover, the polymer can be extrusion formed into rod-, fiber- or tube-like article by extruding it from suitable die. These extrusion formed articles can further be processed into the rods or tubes by stretching them at a temperature lower than glass transition temperature.

In order to further increase strength, cross-linking can also be effected by heating or irradiation with a radiations such as ultraviolet ray and electron beam. In this case, it is effective to use suitable crosslinking agents. Known crosslinking agents can be used and examples thereof are monomers having a plurality of vinyl groups such as divinylbenzene; polyfunctional acrylates such as diallyl phthalate, ethylene glycol dimethacrylate, and trimethylolpropane trimethacrylate; isocyanurates such as triallyl isocyanurate; and polymers having a plurality of unsaturated bonds such as liquid polybutadiene.

The thermoplastic saturated norbornene polymer of the present invention can also be molded or formed by the following methods in addition to the melt extrusion forming.

The polymer can be formed into a sheet by hot pressing. Furthermore, the thermoplastic saturated norbornene polymer can be formed into a film by dissolving it in an aromatic hydrocarbon solvent such as benzene, toluene or xylene, an alicyclic hydrocarbon solvent such as cyclohexane, methylcyclohexane or decalin or a halogen based solvent such as chloroform or monochlorobenzene and casting the solution on a flat plate or on a roll. For polymer of relatively high molecular weight, the solvent solution thereof can be spun into fiber-like article.

Polymer of relatively low molecular weight can be molded to a sheet-like article having a thickness of 0.2 mm or more by normal injection molding and besides, processing method of general thermoplastic resins such as rotational molding can be applied.
(Optical materials and electroconductive composite materials)

The thermoplastic material of the present invention has the characteristics that it is amorphous, excellent in transparency and small in birefrigerance and so is suitable as various optical materials, especially as substrate materials for optical recording medium.

On the surface of an article made from the material of the present invention there may be formed a film of a metal, a metal oxide, a metal nitride, a metal sulfide, a metal halide, or the like by thin film forming methods such as vacuum evaporation and sputtering in the form of single layer or multi-layer depending on the object. In this case, the article is sometimes exposed to a considerably high temperature in vacuum, but in the case of the article obtained according to the present invention, chamber can be drawn to a given degree of vacuum in a short time and furthermore a smooth film free from blister on the surface can be formed because of low content of volatile component and little outgassing.

Further, a recording medium can be produced by providing on a transparent substrate a recording thin film capable of performing optical recording and/or reading.

Recording materials for forming the recording thin film (recording layer) may be known optional rare earth element-transition metal amorphous alloys and as examples thereof, mention may be made of Tb-Fe alloys (Japanese Patent Kokoku No. Sho 57-20691), Dy-Fe alloys (Japanese Patent Kokoku No. Sho 57-20692), Cd-Tb-Fe alloys (Japanese Patent Kokai No. Sho 56-126907), Cd-Tb-Dy-Fe alloys (Japanese Patent Kokai No. Sho 57-94948), Cd-Co alloys (Japanese Patent Kokai No. Sho 54-121719), and Tb-Fe-Co alloys. This rare earth element-transition metal amorphous layer is preferably formed by thin film forming methods such as vacuum evaporation, sputtering and ion plating. Thickness of this amorphous layer is generally 500–1500 Å.

Furthermore, a phase change type recording material may be used as recording layer. Examples thereof are those of Ge-Te type, Sb-Te type, In-Sb type, Ge-Sb-Te type, and In-Sb-Te type. These phase change type recording materials are preferably formed into a recording layer by vacuum evaporation, sputtering, ion plating or the like. Thickness of this amorphous layer is generally 500–2000 Å.

Organic dye recording materials may also be used and as examples of such materials, mention may be made of methine.polymethine type (cyanine:indolonine type, thiazole type) (Japanese Patent Kokai No. Sho 58-1713696); quinones such as naphthoquinones and anthraquinones (Japanese Patent Kokai Nos. Sho 59-199291 and 58-112793); phthalocyanine type (metallo-phthalocyanines) (Japanese Patent Kokai Nos. Sho 612235188 and 59-11292); dithiol type (dithiol metal complexes) (Japanese Patent Kokai No. Sho 57-11090); and other tetrahydrochlorines, dioxanes, dithiazines, thiapyryliums and porphyrins (Japanese Patent Kokai Nos. Sho 58-197088, 61-235188 and 59-78891). Thickness of film formed from these organic dye recording materials is generally 500–5000 Å.

Moreover, the molding material of the present invention can be utilized for erasable type recording card with using, for example, Te-$CS_2$, Pb-Te-Se, Te-C, $TeO_2$, Sb-Se, or Bi-Te, or using change of shape such as bubble formation.

In addition, gold, platinum, aluminum and the like may be used as a reflective film.

In the optical recording medium, there may be provided a surface protective layer on the surface or a protective layer, reflective layer or a dielectric layer between the recording layer and the substrate comprising the polymer of the present invention. Materials for these protective layer and others include, for example, inorganic materials such as CdS, ZnSe, $SiO_2$, Si, $Si_3N$, $Si_3N_4$, AlN, $TiO_2$, $TaO_2$, and $MgF_2$ and organic materials such as ultraviolet-curing resins.

For optical card, there may be laminated directly with other materials and in this case, lamination can be carried out using general adhesives such as solvent type hot melt type and UV curing type adhesives and besides, high frequency and ultrasonic adhesion methods may also be employed.

(Uses)

The material of the present invention is effective for uses such as plastic optical fibers for short-distance information transmission including for automobiles and medical purpose and connector for the optical fibers; plastic lenses such as lens for pick-up of information, lens for projectors, spectacle lens, goggles for sports, and lens for head lamp and tail lamp of automobiles and others; transparent plates for information display such as touch electrode or liquid crystal substrate provided with a transparent electroconductive film and antidazzling filters for screen, polar film and CRT; insulating film and moistureproof coating for electronic devices with utilizing its moistureproof and insulating properties; medical instruments such as injector, pipette, container for medicines, and vessel or film for optical analysis; window materials such as front glass of automobiles, windshield of motorbikes, window material of aircrafts, housing window, transparent shutter, and lighting fixture, and mirrors; beverage containers for juice, alcoholic drink and carbonated beverages and food containers; packaging films; and moistureproofing paints prepared by dissolving in solvent with addition of suitable filler, dye, pigment or the like.

For uses as composite materials made by forming an electroconductive film on the surface, there are uses for touch electrode and liquid crystal substrate with providing a transparent film and electronic devices such as high-frequency circuit substrate and film for capacitors.

For optical recording materials provided with recording thin film on the surface, the material of the present invention is effective as reflective type and dye type information recording media, for example, various memories for computers such as optical card, optical floppy, optical type and others.

The present invention will be explained by the following nonlimiting examples and comparative examples, wherein part and % are by weight unless otherwise notified.

EXAMPLE 1

(preparation of ring opening polymer)

In a 200 liter reaction vessel were changed 90 parts of dehydrated toluene, 0.5 part of triethylaluminum, 1.4 part of triethylamine, and 0.08 part of 1-hexene under nitrogen atmosphere.

While keeping the temperature at 20° C., 30 parts of ethyltetracyclododecene (ETD) and 0.17 part of titanium tetrachloride were continuously added to the reaction system over a period of 1 hour to carry out polymerization reaction. The reaction was allowed to proceed for 1 hour after addition of total amount of EDT and titanium tetrach oride.

Thereafter, isopropyl alcohol/aqueous ammonia (0.5 part/0.5 part) mixed solution was added to stop the reaction and the reaction product was poured into 500 parts of isopropyl alcohol to coagulate it. The coagulated polymer was vacuum dried at 60° C. for 10 hours to obtain 25.5 parts of a ring opening polymer as a dry polymer.

(Hydrogenation reaction)

The resulting ring opening polymer was dissolved in 200 parts of cyclohexane and hydrogenation reaction was carried out in a 200 liter autoclave with addition of 0.6 part of palladium/carbon catalyst (supporting amount: 5%) at 140° C. under a hydrogen pressure of 70 kg/cm$^2$ for 4 hours.

(After-treatment)

The hydrogenation catalyst was removed by filtration and then reaction mixture was poured into 600 parts of isopropyl alcohol to carry out coagulation.

The resulting hydrogenated product was vacuum dried at 60° C. for 10 hours and then redissolved in cyclohexane to prepare a 10% solution. This solution was poured into 600 parts of isopropyl alcohol to again coagulate it. In the same manner as above, drying, coagulation were carried out once more and the hydrogenated product obtained was vacuum dried at 90° C. for 48 hours to obtain 22.6 parts of a hydrogenated product. Yield was 75%.

(Characteristics of polymer)

Hydrogenation rate of the resulting hydrogenation product was 99% or higher according to 1H-NMR spectrum analysis. Molecular weight (in terms of polystyrene) of the product was measured by high performance liquid chromatography (HLC) analysis using toluene as a solvent (by HLC 802L manufactured by Toso Co. with TSK gel G5000H-G4000H as column at flow rate of 1.0 ml/min at 38° C.) to obtain a number-average molecular weight (Mn) of $7.0 \times 10^4$ and a weight-average molecular weight (Mw) of $17.5 \times 10^4$ and molecular weight distribution (Mw/Mn) was 2.5.

Glass transition temperature (Tg) was measured by DSC analysis and content of volatile component was measured by thermogravimetric analysis (TGA) as loss in weight on heating from 30° C. to 350° C. at heating rate of 10° C./min in nitrogen atmosphere to obtain Tg of 142° C. and volatile content of 0.08%.

(Pelletization)

To 100 parts of the resulting saturated polymer was added 0.2 part of 1,3,5-trimethyl-2,4,6-tris(3,5-tertbutyl-4-hydroxybenzyl)benzene (Irganox 1330 manufactured by Ciba-Geigy Corp., vapor pressure $1.3 \times 10^{-12}$ Pa) as an antioxidant and this was mixed by Henschel mixer and pelletized by a extruder at 230° C.

(Forming)

The pellets were molten and extrusion formed from T-die using a 30 mm$\phi$ extruder manufactured by Thermoplastic Co. with elevating resin temperature to 280° C. to make a film of 20 cm in width and 100 $\mu$m in thickness. In this case, take-up roll temperature of the first step was 130° C. and that of the second step was 121° C.

According to visual evaluation, there were neither streaks on the surface nor internal blowing and thus a transparent film free from defects was obtained. Tensile strength of the film was 900 kg/cm$^2$. This film was put between two polarizing sheets whose polarization axes were crossed at a right angle and was observed under rotation to recognize no bright portion. That is, there was no birefringence. Furthermore, this film was heated at 110° C. for 48 hours in an air oven to find no coloration.

COMPARATIVE EXAMPLE 1

A reaction mixture obtained by ring opening polymerization and hydrogenation in the same manner as in Example 1 was coagulated only once and vacuum dried at 90° C. for 48 hours to obtain 25.3 parts of a hydrogenation product. Yield was 84%.

The resulting polymer had molecular weights Mn: $6.8 \times 10^4$ and Mw: $17.3 \times 10^4$, and Mw/Mn: 2.6, a Tg of 138° C., and a volatile content of 0.48%.

In the same manner as in Example 1, antioxidant was added and the polymer was pelletized and film was prepared therefrom.

The resulting film was visually observed to find that streaks in the form of stripes were formed in the extrusion direction and a large number of bubbles were generated in the inner portion and thus the film had haze. Tensile strength was 200 kg/cm$^2$ which was markedly lower than that of the film obtained in Example 1.

EXAMPLE 2

In a 50 liter reaction vessel were charged 200 parts of dehydrated toluene, 25 parts of tetracyclododecene, 5 parts of dicyclopentadiene and 0.05 part of 1-hexane as monomers in nitrogen atmosphere.

While keeping the temperature at 20° C., 0.5 part of triethylaluminum, 1.4 part of triethylamine and 0.17 part of titanium tetrachloride were added to the reaction system to carry out polymerization. Temperature of the reaction system increased up to 52° C. in 2 minutes after addition of catalyst due to exothermic heat of polymerization reaction. Thereafter, temperature of the reaction system gradually decreased. After the reaction was allowed to proceed for 1 hour, an isopropyl alcohol/aqueous ammonia (0.5 part/0.5 part) mixed solution was added to stop the reaction.

The reaction product was poured into 1000 parts of isopropyl alcohol and coagulated. This coagulated product was dried in the same manner as in Example 1 to obtain 10.5 parts of a ring opening polymer.

The resulting ring opening polymer was dissolved in 200 parts of cyclohexane and 0.3 part of palladium/carbon catalyst was added and hydrogenation was carried out under the same conditions as in Example 1. After the hydrogenation catalyst was removed by filtration, the product was coagulated thrice with isopropyl alcohol in the same manner as in Example 1 to obtain 9.5 parts of a hydrogenation product. Hydrogenation rate was at least 99%. Yield was 32%.

The resulting saturated polymer had molecular weights Mn: $30.6 \times 10^4$ and Mw: $122 \times 10^4$, and Mw/Mn: 4.0, a Tg of 132° C. and a volatile content of 0.05%.

In the same manner as in Example 1, antioxidant was added and the polymer was extrusion formed into a rod from a die of 3 mm$\phi$.

The resulting rod-like molded article was visually observed to find neither streaks on the surface nor blowing in the inner portion, and thus a transparent rod-like article free from defects was obtained. Tensile strength of the rod was 1200 kg/cm$^2$.

This rod-like article was put between two polarizing sheets whose polarizing axes crossed at a right angle and observed under rotating to find no birefringence. This rod-like article was heated at 110° C. for 48 hours to cause no coloration.

COMPARATIVE EXAMPLE 2

In a 200 liter reaction vessel were charged 70 parts of dehydrated toluene, 0.5 part of triethylaluminum, 1.4 part of triethylamine, and 0.15 part of 1-hexane in nitrogen atmosphere.

While keeping the temperature at 20° C., 22 parts of methyltetracyclododecene (MTD), 8 parts of norbornene and 0.17 part of titanium tetrachloride were continuously added to the reaction system over a period of 3 hour to carry out polymerization reaction. The reaction was allowed to proceed for 1 hour after addition of total amount of MDT and titanium tetrachloride. Isopropyl alcohol/aqueous ammonia (0.5 part/0.5 part) mixed solution was added to stop the reaction and the reaction product was poured into 500 parts of isopropyl alcohol to coagulate it. The coagulated polymer was vacuum dried at 60° C. for 10 hours to obtain 25.8 parts of a ring opening polymer as a dry polymer.

The resulting ring opening polymer was hydrogenated in the same manner as in Example 1 and reaction mixture was coagulated only once with isopropyl alcohol and was vacuum dried at 90° C. for 48 hours to obtain 22.3 parts of hydrogenation product. Yield was 74%.

The product had molecular weights Mn: $2.9 \times 10^4$, Mw: $4.9 \times 10^4$, and Mw/Mn: 2.1, and a Tg of 132° C. and a volatile content of 0.39%.

In the same manner as in Example 1, antioxidant was added to the product, this was pelletized and a film was prepared.

The resulting film was visually observed to find that the film was greatly waved and was not flat. It is considered that this is due to small molecular weight distribution of polymer. Furthermore, streaks were formed in extrusion direction on the surface and internal blowing occurred and the film was hazed. Such streaks, blowing, haze, and reduction of strength are considered to have been caused by high volatile content.

EXAMPLE 3

10 parts of the hydrogenation product obtained in Comparative Example 1 and 10 parts of the hydrogenation product obtained in Example 2 were dissolved in cyclohexane and blended. This solution was added dropwise to isopropyl alcohol and coagulated product was vacuum dried to obtain 18.6 parts of a blend of resins.

This had molecular weights Mn: $18.7 \times 10^4$, Mw: $97 \times 10^4$, and Mw/Mn: 5.2, and had a Tg of 132° C. and a volatile content of 0.12%.

In the same manner as in Example 1, antioxidant was added, the product was pelletized and film was prepared therefrom.

The resulting film was visually observed to find neither streaks on the surface nor internal blowing, and thus the film was transparent and free from defects. Tensile strength was 1050 kg/cm². This film was put between two polarizing sheets whose polarizing axes crossed at a right angle and observed under rotating to find no birefringence. The film was heated at 110° C. for 48 hours to cause no coloration.

Furthermore, a film was formed by reducing the take-up roll temperature of the first step to 95° C. and that of the second step to 87° C. The resulting film also had flat surface and had no residual stress.

EXAMPLE 4

Addition copolymerization reaction of ethylene and 2-methyl-1,4,5,8-dimethano-1,2,3,4,4a,5,8,8a-octahydronaphthalene (M-DMON) was continuously carried out using a 200 liter polymerizer provided with agitating blade.

That is, from the top of the polymerizer, a solution of M-DMON in toluene a solution of $VO(OC_2H_5)Cl$ in toluene, and a solution of ethylaluminum sesquichloride $[Al(C_2H_5)_{1.5}Cl_{1.5}]$ in toluene were continuously fed to the polymerizer from the top thereof at a rate of 90 l/hr, at a rate of 70 l/hr, and at a rate of 40 l/hr so that M-DMON concentration in the polymerizer was 100 g/l, so that vanadium concentration in the polymerizer was 0.3 mmol/l, and so that aluminum concentration in the polymerizer was 2 mmol/l, respectively.

On the other hand, polymeric liquid was continuously drawn from bottom of the polymerizer so that amount of the polymeric liquid in the polymerizer was always 100 liters. Further, ethylene was fed at 2300 l/hr and nitrogen was fed at 800 l/hr from the top of the polymerizer.

Copolymerization reaction was carried out by controlling temperature to 10° C. using a refrigeration medium. A small amount of methanol was added to the polymeric liquid drawn from the bottom of the polymerizer to stop polymerization reaction and the liquid was introduced into a large amount of isopropyl alcohol to precipitate the copolymer produced, which was washed with isopropyl alcohol. The copolymer was obtained at a rate of 3 kg/hr. The polymer was vacuum dried at 130° C. for 24 hours.

Loss in weight on heating of the resulting addition copolymer was measured to obtain 0.45%. Since this was unsuitable for the object of the present invention, this was again coagulated.

That is, 20 parts of the addition copolymer was dissolved in 100 parts of cyclohexane and the solution was added dropwise to 200 parts of isopropyl alcohol to coagulate it, followed by vacuum drying at 90° C. for 48 hours to obtain 18.9 parts of addition copolymer.

The copolymer had molecular weights Mn: $7.8 \times 10^4$, Mw: $22 \times 10^4$, and Mw/Mn: 2.8, and a Tg of 147° C., and a volatile content of 0.11%.

In the same manner as in Example 1, antioxidant was added to the copolymer and this was pelletized and a film was prepared therefrom.

The resulting film was visually observed to find neither streaks on the surface nor internal blowing, and thus the film was transparent and free from defects. Tensile strength was 1050 kg/cm². This film was put between two polarizing sheets whose polarizing axes crossed at a right angle and observed under rotating to find no briefringence. The film was heated at 110° C. for 48 hours, resulting in no coloration.

Furthermore, a film was formed by reducing the take-up roll temperature of the first step to 95° C. and that of the second step to 87° C. The resulting film also had flat surface and had no residual stress.

EXAMPLE 5

The polymer before addition of antioxidant in Example 1 was pelletized without addition of antioxidant by an extruder at 230° C.

The pellets were extrusion formed from T-die by a 30 mmφ extruder manufactured by Thermoplastic Co. to obtain a sheet of 20 cm in width and 1 mm in thickness.

The resulting sheet was visually observed to find neither streaks on the surface nor internal blowing, and thus the sheet was transparent and free from defects. Tensile strength was 900 kg/cm$^2$. This sheet was put between two polarizing sheets whose polarizing axes crossed at a right angle and observed under rotating to find no birefringence. The sheet was heated at 110° C. for 48 hours, resulting in slight coloration in yellow.

EXAMPLE 6

To 100 parts of the polymer obtained in Example 1 was added 0.2 part of pentaerythrityl-tetrakis-3-(3,5-di-tert-butyl-4-hydroxyphenyl)propionate (Irganox 1010 manufactured by Ciba-Geigy Corp., vapor pressure $1.3 \times 10^{-12}$ Pa) as an antioxidant and this was mixed by Henschel mixer and then, the mixture was pelletized and extrusion formed into a sheet in the same manner as in Example 5.

In the same manner as in Example 5, this sheet was tested to find neither streaks on the surface nor internal blowing. Thus, the sheet was transparent and free from the defects. Tensile strength was 900 kg/cm$^2$ as in Example 5. No birefringence was observed in this sheet. No coloration occurred by heating.

EXAMPLE 7

A sheet was obtained in the same manner as in Example 6 except that 0.5 part of 2,4-bis-(n-octylthio)-6-(4-hydroxy-3,5-di-tert-butylanilino)-1,3,5-triazine (Irganox 565 manufactured by Ciba-Geigy Corp., vapor pressure $1.3 \times 10^{-12}$ Pa) was used as antioxidant.

Neither streaks on the surface nor internal blowing were seen and the sheet was transparent and free from defects. Tensile strength was 900 kg/cm$^2$ which was the same as in Example 6. No birefringence was observed in this sheet. No coloration occurred by heating.

EXAMPLE 8

A sheet was obtained in the same manner as in Example 6 except that 2 parts of 2,5-di-tert-amylhydroquinone (Nocrack DAH manufactured by Ohuchi Shinko Kagaku Co., vapor pressure $1 \times 10^{-9}$ Pa or less) was used as antioxidant.

Neither streaks on the surface nor internal blowing were seen and the sheet was transparent and free from defects. Tensile strength was 900 kg/cm$^2$ which was the same as in Example 6. No birefringence was observed in this sheet. No coloration occurred by heating.

EXAMPLE 9

A sheet was obtained in the same manner as in Example 6 except that 0.02 part of tris(2,4-di-tertbutylphenyl) phosphite (Irganox 168 manufactured by Ciba-Geigy Corp., vapor pressure $3 \times 10^{-8}$ Pa) was used as antioxidant.

Neither streaks on the surface nor internal blowing were seen and the sheet was transparent and free from defects. Tensile strength was 900 kg/cm$^2$ which was the same as in Example 6. No birefringence was observed in this sheet. No coloration occurred by heating.

EXAMPLE 10

A sheet was obtained in the same manner as in Example 6 except that 0.2 part of 2,2-thio-diethylenebis(3-(3,5-di-tert-butyl-4-hydroxyphenyl)) propionate (Irganox 1035 manufactured by Ciba-Geigy Corp., vapor pressure $1.3 \times 10^{-9}$ Pa) was used as antioxidant.

Neither streaks on the surface nor internal blowing were seen and the sheet was transparent and free from defects. Tensile strength was 900 kg/cm$^2$ which was the same as in Example 6. No birefringence was observed in this sheet. No coloration occurred by heating.

EXAMPLE 11

A sheet was obtained in the same manner as in Example 6 except that 0.1 part of Irganox 1010 and 0.1 part of Irganox 168 (vapor pressure $1.3 \times 10^{-8}$ Pa) were used as antioxidants.

Neither streaks on the surface nor internal blowing were seen and the sheet was transparent and free from defects. Tensile strength was 900 kg/cm$^2$ which was the same as in Example 6. No birefringence was observed in this sheet. No coloration occurred by heating.

COMPARATIVE EXAMPLE 3

A sheet was obtained in the same manner as in Example 6 except that 10 parts of Irganox 565 (vapor pressure $3 \times 10^{-12}$ Pa) was used as antioxidants.

Neither streaks on the surface nor internal blowing were seen and the sheet was transparent and free from defects. Tensile strength was 720 kg/cm$^2$ which was lower than that in Example 6. When this sheet was put between two polarizing sheets and observed to find bright portion and dark portion and thus, birefringence was seen.

EXAMPLE 12

Example of electroconductive composite material is shown below. Materials useful for recording of information, transmission of information and for electronic devices can be provided by processing the electroconductive composite material by lithography or the like.

The sheet obtained in Example 6 was cut to 10 cm × 10 cm and thereon was formed an ITO film of 3000 Å thick by RF magnetron sputtering apparatus manufactured by Nihon Shinku Gijitsu Co. using an alloy target of In$_2$O$_3$/SnO$_2$ (90:10), thereby to obtain a transparent electroconductive sheet having a light transmission of 81% for 700 nm and a specific resistance of $2 \times 10^{-3}$ Ω.cm.

The resulting electroconductive sheet was observed by a microscope. The film had a flat surface and was free from defects.

EXAMPLE 13

The pellets prepared in Example 1 were dissolved in cyclohexane and a cast film of 15 μm thick was formed using the solution on a platinum electrode and electrolysis polymerization was conducted using a solution of pyrrole and tetraethylammonium tetrafluoroborate in acetonitrile as electrolyte solution to obtain a flat transparent electroconductive film free from defects and having a light transmittance of 63% and specific resistance of 39 Ω.cm.

EXAMPLE 14

The pellets prepared in Example 2 were press formed into a square plate of 10 cm × 10 cm with a thickness of 1 mm and electrolytic copper foil was heat fusion bonded to both sides of the square plate at 280° C. to make a high frequency circuit substrate.

This substrate had a dielectric constant of 2.2, a dielectric loss of $4.4 \times 10^{-4}$ and a peel strength of 1 kg/cm.

EXAMPLE 15

The following experiment was conducted in order to examine the effect of predrying.

The pellets obtained in Example 1 were extrusion formed as they were under the same conditions as in Example 1 to obtain a sheet-like article of 500 μm thick. Tensile strength of this sheet was 900 kg/cm².

This article was visually observed to find that it was transparent and had no conspicuously large defects, but this wa observed by a light microscope of 400x magnification in ten fields and the number of microvoids was counted to find microvoids of about 5 μm in size. Further, this sheet was kept in a thermo-hygrostat box of 80° C. and 90% in relative humidity for 1000 hours and then taken out and visually observed to find that it was wholly hazed and had many small crack-like defects.

Results of tests on sheets obtained by predrying the pellets obtained in Example 1 under various drying conditions by a warm air dryer and then forming the predried pellets are shown in Table 1 together with the above results.

TABLE 1

| Experimental No. | Predrying conditions | | Properties of sheet | | Appearance after molding | | Appearance by visual observation after high temperature and high humidity test |
|---|---|---|---|---|---|---|---|
| | Temperature (°C.) | Time (hrs.) | Thickness (μm) | Strength (kg/cm²) | Visual observation | Observation by microscope | |
| 1 | No | | 500 | 900 | Good | D | Haze |
| 2 | 110 | 0.5 | 500 | 900 | " | D | Haze |
| 3 | 110 | 6.0 | 500 | 900 | " | A | Good |
| 4 | 120 | 0.5 | 500 | 900 | " | B | Somewhat haze |
| 5 | 120 | 2.0 | 500 | 900 | " | A | Good |
| 6 | 120 | 4.0 | 500 | 900 | " | A | " |
| 7 | 130 | 1.5 | 500 | 900 | " | A | " |

(Note) Criteria for evaluation of results obtained by observation by microscope are as follows.
A: No microvoids were observed.
B: Two or less microvoids were observed.
C: Four or less microvoids were observed.
D: At least five microvoids were observed.

As is clear from the above Examples, the present invention provides a molding of forming material excellent in heat resistance and water resistance which comprises a thermoplastic saturated norbornene polymer. Especially, when extrusion formed, the material of the present invention provides articles excellent in strength and free from the defects caused by blowing and the like. Furthermore, articles free from microvoids can be obtained by carrying out predrying treatment. Furthermore, the material of the present invention is suitable for optical uses because of its excellent optical characteristics such as transparency and besides, it is suitable as electroconductive composite materials. Moreover, optical recording media can be produced excellent in endurance and others by using transparent substrates obtained from the material of the present invention.

What is claimed is:

1. A thermoplastic composition comprising a thermoplastic saturated norbornene polymer having a number-average molecular weight (Mn) of 50,000 to 500,000 and a weight-average molecular weight (Mw) of 100,000 to 2,000,000 which are measured by high performance liquid chromatography, and a molecular weight distribution (Mw/Mn) of at least 2.2, and a maximum volatile content of 0.3% by weight, which contains an antioxidant having a maximum vapor pressure of $10^{-6}$ Pa at 20° C. in an amount of 0.01-5 parts by weight based on 100 parts by weight of the thermoplastic saturated norbornene polymer.

2. A thermoplastic composition according to claim 1, wherein the thermoplastic saturated norbornene polymer has a glass transition temperature (Tg) of at least 100° C.

3. A thermoplastic composition according to claim 1, wherein the thermoplastic saturated norbornene polymer has a hydrogenation rate of at least 90%.

4. A thermoplastic composition according to claim 1, a maximum volatile content in the polymer is 0.2% by weight.

5. A thermoplastic composition according to claim 1, wherein the hydrogenation rate of the polymer is 95% or higher and a maximum volatile content in the polymer is 0.1% by weight.

6. A thermoplastic composition according to claim 2, wherein Tg of the polymer is 120°-200° C.

7. A thermoplastic composition according to claim 1, the thermoplastic saturated norbornene polymer is a polymer of norbornene monomer mainly composed of a tetracyclic norbornene monomer.

8. A thermoplastic composition according to claim 7, wherein the norbornene monomer is a lower alkyl or lower alkylidene group substituted monomer.

9. A thermoplastic composition according to claim 8, wherein the lower alkyl or lower alkylidene substituent has two or three carbon atoms.

10. A thermoplastic composition according to claim 1, wherein the vapor pressure of the antioxidant is at least $10^{-8}$.

11. A thermoplastic composition according to claim 1, wherein the antioxidant is a hindered phenol, an aminophenol, a hydroquinone, or a phosphite.

12. A thermoplastic composition for films or sheets which is obtained by pelletizing the composition of claim 1 by melt extrusion, and drying the obtained pellets at a maximum temperature of 5° C. below the Tg of said copolymer.

13. A thermoplastic composition for films or sheets according to claim 12, wherein the drying is carried out by keeping the pellets at a temperature lower by 5°-30° C. than glass transition temperature (Tg) of the thermoplastic saturated norbornene polymer for at least 1 hour.

14. A film or sheet article having a tensile strength of at least 800 kg/cm² and substantially free from microvoids which is obtained by molding the thermoplastic composition according to claim 1.

15. A film or sheet article according to claim 14, which is obtained by melt extrusion molding.

16. An optical material obtained by molding the composition of any of claims 1-13.

17. An electroconductive composite material which comprises the film or sheet article of claim 14, on the surface of which an electroconductive film is formed.

18. An optical recording medium which comprises a transparent substrate comprising the film or sheet article of claim 14 or 15 on which a recording thin film capable of performing optical recording and/or reading is formed.

* * * * *

UNITED STATES PATENT AND TRADEMARK OFFICE
CERTIFICATE OF CORRECTION

PATENT NO.   : 5,187,012
DATED        : February 16, 1993
INVENTOR(S)  : Takahashi, et al It is certified that error appears in the above-indentified patent and that said Letters Patent is hereby corrected as shown below:

On the title page, Item [30], in the Foreign Application Priority Data, add the following document:

--Nov. 28, 1990 [JP] Japn   ................................2-331114--

Signed and Sealed this

Twelfth Day of April, 1994

Attest:

BRUCE LEHMAN

*Attesting Officer*                    *Commissioner of Patents and Trademarks*